June 4, 1929.  A. O. ABBOTT, JR  1,715,973
METHOD OF AND APPARATUS FOR MANUFACTURING PNEUMATIC TIRES
Filed July 30, 1927   2 Sheets-Sheet 1
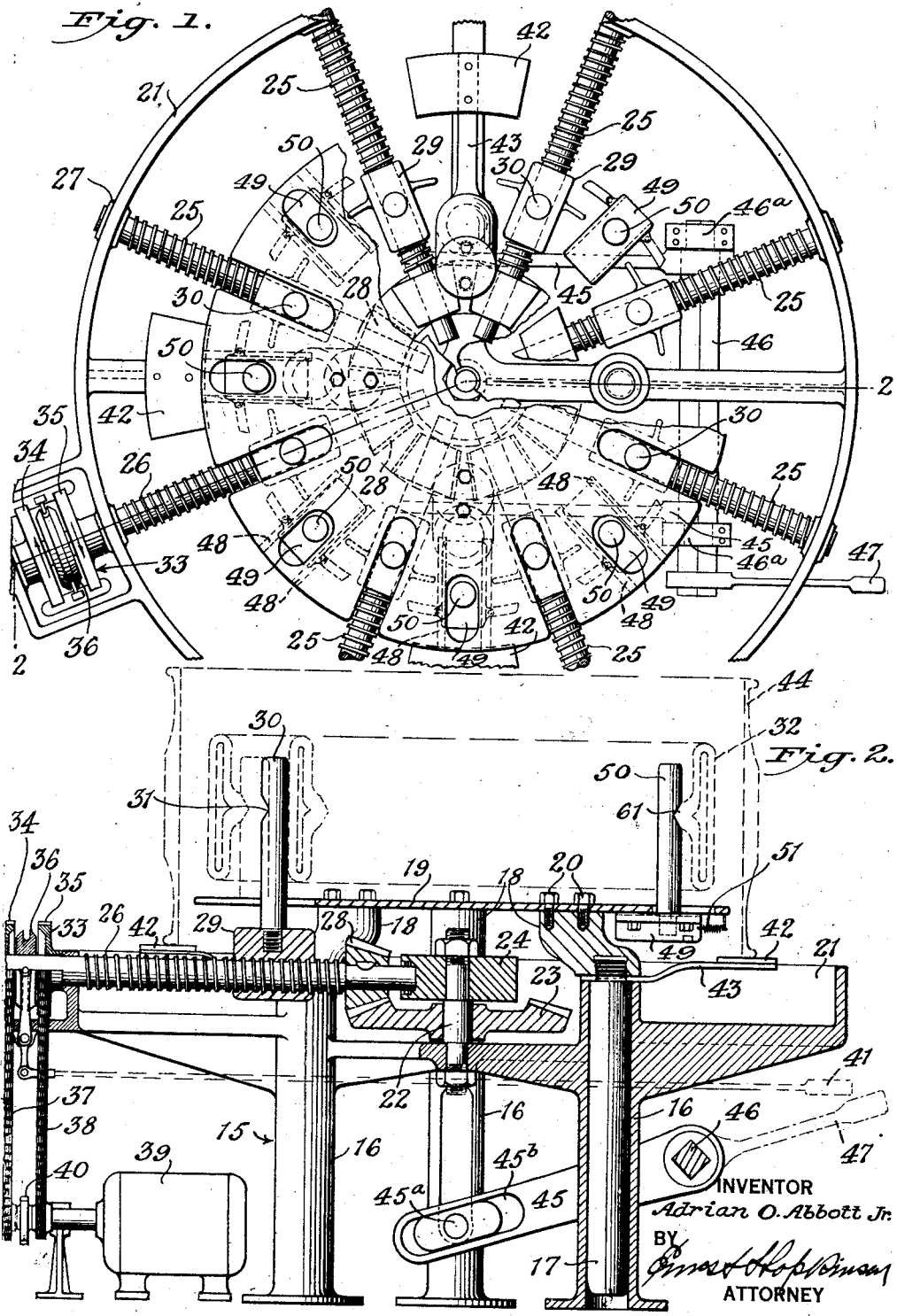
INVENTOR
Adrian O. Abbott Jr.
BY
ATTORNEY June 4, 1929.  A. O. ABBOTT, JR  1,715,973
METHOD OF AND APPARATUS FOR MANUFACTURING PNEUMATIC TIRES
Filed July 30, 1927  2 Sheets-Sheet 2
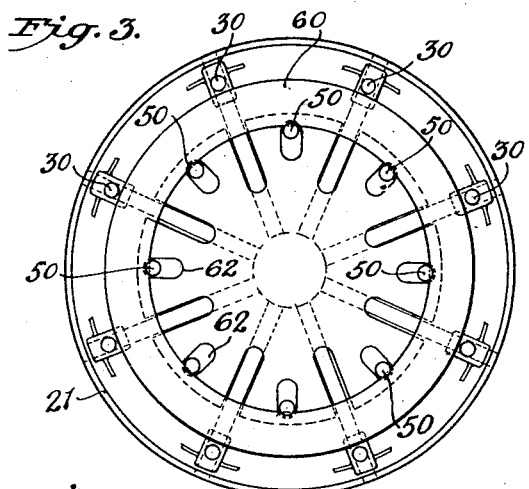
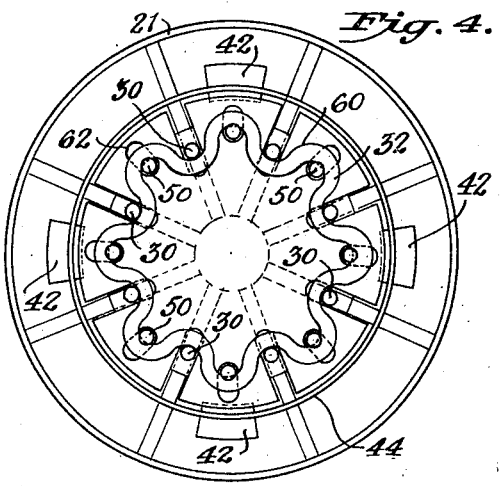
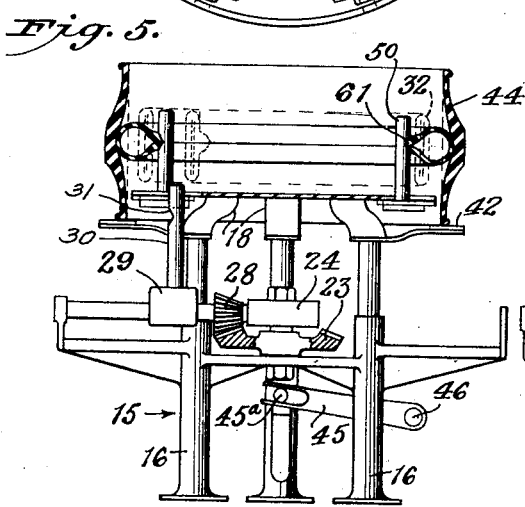
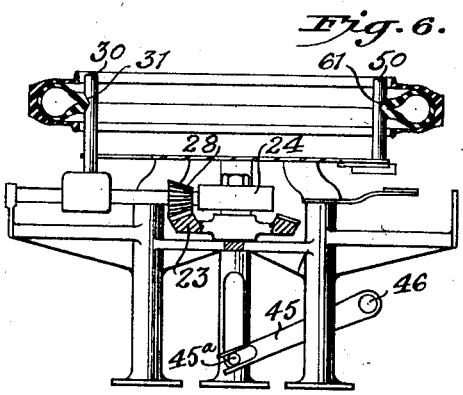
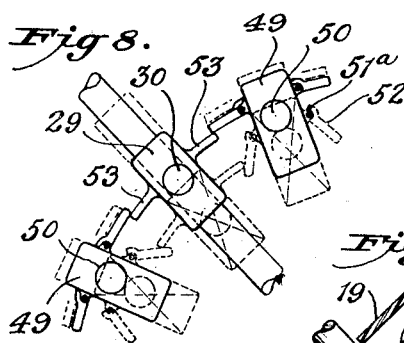
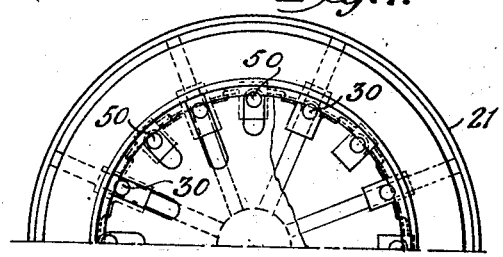
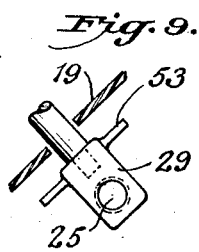
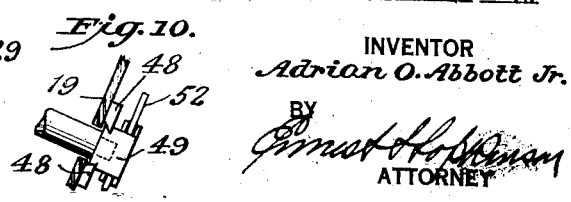
INVENTOR
Adrian O. Abbott Jr.
BY
ATTORNEY Patented June 4, 1929.

1,715,973

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

METHOD OF AND APPARATUS FOR MANUFACTURING PNEUMATIC TIRES.

Application filed July 30, 1927. Serial No. 209,565.

This invention relates to the manufacture of pneumatic tires for vehicles in which the tires are initially built in substantially flat form and subsequently shaped to tire form and has for its primary object to provide a new and improved method of and apparatus for performing the shaping operation. Further objects are to reduce the time element in the manufacture of tires, to insure proper shaping and to provide a superior product.

In the apparatus forming the subject matter of the present invention, a flat tire band is shaped to tire form and this is accomplished by collapsing a curing bag sufficiently to enable the band to be slipped over it. The curing bag is then released, filled with air and forced against the band. The pressure exerted by the curing bag upon the inner face of the band causes such band to be expanded into the desired shape. Molds are then put over the combined band and curing bag for subsequent operations.

Many other objects and advantages of the invention will be better understood by reference to the following specification when considered in connection with the accompanying drawings in which:

Fig. 1 is a plan view of one embodiment of the apparatus with portions thereof removed to expose the operating parts.

Fig. 2 is a vertical section on the line 2—2 of Fig. 1.

Figs. 3-7 inclusive are diagrammatical views showing the cycle of operations of the apparatus.

Figs. 8-10 inclusive are detailed views.

Referring to the drawings, the apparatus is mounted on a cast base 15 composed of tubular legs 16 here four in number which act as guides for elevating posts 17. On the upper extremity of each of these elevating posts is mounted a bracket 18 which forms one of the supports for a platen 19 secured thereto by screws 20 or other suitable means. A bearing ring 21 is also formed on the base 15.

In the center of the base 15 is mounted a vertical spindle 22 and upon this spindle is revolubly mounted a ring gear 23 and a bearing 24. The bearing 24 supports the inner end of a series of radially disposed screws 25 and 26, the outer portion of these screws being supported in suitable bearings as 27 in bearing ring 21. A bevel gear 28 is keyed upon the inner end of each of the screws 25 and 26 and meshes with the ring gear 23. A threaded block 29 is mounted on each of the screws 25 and 26 and a pin 30 is securely fastened to this block. The pin 30 is preferably provided with a notch 31 to accommodate the inner rim diameter of a curing bag as 32.

A reversible clutch 33 is provided at the outer end of the screw 26 and this consists of plates or disc pulleys 34 and 35 running loose on the shaft and a shiftable clutch member 36 keyed upon the screw and selectively movable into engagement with either plate 34 or 35. The plates or pulleys 34 and 35 are rotated in opposite directions, as indicated by the arrows in Fig. 1, by silent chains 37 and 38 respectively driven from some suitable source of power as the motor 39. In the present embodiment the chain 38 is driven directly by the shaft of the motor, and gearing 40 is provided to drive the chain 37 from this shaft.

When the clutch 36 is engaged with either the plates 34 or 35 the screw 26 is rotated causing the block 29 to move longitudinally of the axis thereof, the direction of movement depending upon which plate of the clutch is engaged, and the rotation of the screw 26 causes a like rotation of the screws 25, due to the meshing of gears 23 and 28. This movement of the blocks 29 carries the pins 30 in or out as desired by the operator who controls the clutch 33 by any convenient means such as an operating handle as 41.

Plates 42 are supported by corresponding radially disposed brackets 43 mounted on the upper extremities of the elevating posts 17, and these plates are adapted to support the tire casing as 44 in the manner indicated in Figs. 2 and 5. These plates 42 move vertically in unison with the platen 19.

The platen 19 is elevated by means of lever arms 45 mounted on the shaft 46 and operated by a suitable handle as 47. The shaft 46 is revolubly supported in bearings 46$^a$. Pins 45$^a$ in the posts 17 enter slots 45$^b$ in the arms 45. Two of these posts 17 are provided with the operating lever arms and the other two act as guides.

Guides 48 are fastened to the bottom surface of the platen 19 adjacent its outer edge and corresponding blocks 49 are slidable radially between each pair of these guides. A pin 50 is mounted on each of these blocks 49. The blocks 49 are normally held in loading position by corresponding tension springs as 51 (Fig. 2). The blocks 29 and 49 are equipped with projecting arms 53 and 52 respectively (Fig. 8), the arms 53 of the blocks 29 being rigid while those of the blocks 49 are collapsible through an arc of approximately 90°. A shoulder as 51ᵃ on the collapsible arms 52 permits these arms to swing inwardly in the manner indicated in dotted lines but prevents their swinging outwardly beyond the perpendicular position indicated in solid lines. When the blocks 29 move outwardly on their respective screws in the manner previously described, the fixed arms 53 thereof engage the adjacent arms on the blocks 49 and cause these latter blocks to move outwardly until the length of the arms fails to span the distance between the blocks. The blocks 29 may then continue to move outwardly but the outward movement of the blocks 49 ceases. During the inward movement of the blocks 29 subsequent to such outward movement, the arms on the blocks 49 collapse in the manner indicated, permitting the blocks 29 to return to their inner position. An end view of one of the blocks 29 and associated parts is shown in Fig. 9. A similar view of the blocks 49 is shown in Fig. 10.

The operation of the apparatus is fully illustrated in Figs. 3-7 inclusive. Fig. 3 indicates the initial position of the parts. A non-inflated curing bag as 60 has been inserted in the apparatus and the notches 61 on the pins 50 hold the bag in place. The pins 30 have previously been moved by their respective screws to the outer position indicated. The clutch member 36 is now shifted into engagement with the plate 34 and the blocks 29 moved inwardly. This collapses the bag 60 in the manner indicated in Fig. 4, the pins 50 being drawn inwardly against the action of their respective springs 51 as far as the slots 62 in the platen will permit. The flat tire band 44 is then slipped into position as indicated in Fig. 4, resting on the plates 42. The platen 19 is next elevated as shown in Fig. 5. This pulls the curing bag from the pins 29 and allows it to snap into the casing 44. The platen 19 is then lowered and the pins 29 come up inside the inner periphery of the curing bag. The curing bag is inflated and the apparatus is ready for the expanding operation. The clutch member 36 is engaged with the plate 35, causing the pins 30 to be moved outwardly by the blocks 29. These blocks force the blocks 49 outwardly and thus the pins 50 act simultaneously with the pins 30 to force the air bag against the band 44, the pins all being equi-distant from the center and forming a circle. This position of the pins is illustrated in Fig. 7. Fig. 6 shows the final position with the band fully expanded to tire form. The pins have been moved substantially to the rim diameter of the tire. The usual toe rings are then placed on the tire and the molds placed over the assembled tire and bag. The tire is now ready for vulcanization. The rings maintain the pressure of the bag on the shaped band or tire during the vulcanization operation.

From the foregoing description it will be obvious that a simple and effective method of shaping a tire has been provided. The air bag exerts a uniform pressure on the inner periphery of the tire and insures accurate shaping. The shaping is quickly performed and greatly reduces the time element in the manufacture of the tires. The apparatus is simple in construction and easily operated.

I am aware that the form and arrangement of parts of the apparatus may be varied without departing from the spirit of my invention and contemplate all changes therein as fall within the scope of the following claims. While the description has been confined to the manufacture of tires, it is appreciated that the principles thereof are equally applicable to the manufacture of other rubber articles.

Having thus described my invention, what I claim and desire to protect by Letters Patent is:

1. In apparatus for manufacturing pneumatic tires, means for supporting a flat tire band, and means independent of the air bag for forcing an air bag against the inner periphery of the supported band to expand said band to substantially tire form.

2. In apparatus for manufacturing pneumatic tires, means for supporting a flat tire band, means for supporting an air bag within said band, and means acting exteriorly of the air bag for expanding said bag to shape said band to substantially tire form.

3. In apparatus for manufacturing pneumatic tires, means for supporting a flat tire band, means for supporting an air bag within said band, and members movable radially within said bag for forcing said bag against the inner periphery of the supported band to expand said band to substantially tire form.

4. In apparatus for manufacturing pneumatic tires, means for collapsing an air bag to permit the insertion of the same within a flat tire band, and means for expanding said bag within said band to shape said band to substantially tire form.

5. In apparatus for manufacturing pneumatic tires, means for supporting a flat tire band, means for collapsing an air bag to permit the insertion thereof within said band, and means for expanding said bag to shape said band to substantially tire form.

6. In apparatus for manufacturing pneumatic tires, means for collapsing an air bag to permit the insertion thereof within a flat tire band, means for releasing said collapsing means after the bag has been inserted, and means for expanding said bag to shape said band to substantially tire form.

7. In apparatus for manufacturing pneumatic tires, means for supporting a flat tire band, means for collapsing an air bag to permit the same to be inserted within the supported bag, and means for releasing the collapsed bag after the same is in position therein, and means for expanding said bag after it has been released in said position to force the bag against the inner periphery of said band and shape band to substantially tire form.

8. In apparatus for manufacturing pneumatic tires, means for supporting a flat tire band, means for collapsing an air bag to permit it to be inserted within said band, means for moving the collapsed band into position therein and then releasing the same, and means movable radially of said band for expanding said bag and forcing the same against the inner periphery of the band to shape said band to substantially tire form.

9. In apparatus for manufacturing pneumatic tires, means for supporting a flat tire band, means for collapsing an air bag to reduce the diameter thereof and permit said bag to be inserted within said band, means for moving the collapsed bag into position therein, means for actuating said collapsing means to release said bag after said bag has been positioned therein, and means for expanding the released bag to force the same against the inner periphery of said band and thereby shape said band to substantially tire form.

10. In apparatus for manufacturing pneumatic tires, means for expanding a flat tire band to substantially tire form including an air bag insertable within said band, and means independent of the air bag for expanding said bag to exert pressure on the inner periphery of said band.

11. In apparatus for manufacturing pneumatic tires, means for expanding a flat tire band to substantially tire form including an air bag insertable within said band, and means for exerting external pressure on said bag to increase the diameter thereof and cause said bag to be forced against the inner periphery of said band.

12. In apparatus for manufacturing pneumatic tires, means for shaping a flat tire band to substantially tire form including a ring shaped air bag insertable within said band, a plurality of pins movable radially of said band for expanding said bag and forcing the same against the inner periphery of said band, and means for actuating said pins.

13. In apparatus for manufacturing pneumatic tires, means for shaping a flat tire band to substantially tire form including an annular air bag of an external diameter normally less than the inner diameter of the band to be shaped, means for positioning said bag within said band with their axes coincident, and a plurality of members movable radially of said band to expand said bag radially and cause the same to exert pressure on the inner periphery of said band.

14. In apparatus for manufacturing pneumatic tires, means for shaping a flat tire band to substantially tire form including an annular air bag, means for collapsing said bag to permit it to be inserted within said band, means for moving the collapsed bag laterally into position therein, means for releasing said collapsing means to enable the bag to assume its normal shape with its axis coincident with the axis of the band, and means for exerting external pressure on the inner periphery of said bag to cause said bag to be expanded and forced against the opposing face of said band.

15. The method of shaping a flat tire band to substantially tire form which consists in placing an annular air bag within said band, and exerting pressure on the inner periphery of said bag to cause said bag to be expanded and forced against the inner periphery of the band.

16. The method of shaping a flat tire band to substantially tire form which consists in distorting the bag to reduce the diameter thereof, placing the distorted bag withing said band, releasing said bag to enable it to assume its normal form therein, and expanding said bag to exert pressure on the inner periphery of said band.

17. The method of shaping a flat tire band to substantially tire form which consists in collapsing a non-inflated air bag, placing the collapsed bag within said band, releasing the bag to enable it to assume its normal form therein, inflating the bag, and expanding the inflated bag to cause it to exert pressure on the inner periphery of the band.

18. The method of shaping a flat tire band to substantially tire form which consists in collapsing a non-inflated air bag to reduce the diameter thereof, placing the collapsed bag within said band, releasing the bag, inflating the bag, and exerting external pressure on the inner periphery of the inflated bag to cause said bag to be expanded and to exert corresponding pressure on the inner periphery of said band.

19. The method of manufacturing pneumatic tires which consists in collapsing a non-inflated annular air bag, placing the collapsed bag within a flat tire band with their axes coincident, releasing the bag to permit it to assume its normal shape while maintaining it in position therein, inflating the bag, expanding the inflated bag to exert pressure on the inner periphery of the band and continuing such expansion of the bag until the band has been expanded to substantially tire form, and vulcanizing the shaped band in a mold while said band is still subjected to pressure by said bag.

Signed at Detroit, county of Wayne, State of Michigan, this 16th day of July, 1927.

ADRIAN O. ABBOTT, JR.